(12) United States Patent
McCoy et al.

(10) Patent No.: US 9,656,610 B2
(45) Date of Patent: May 23, 2017

(54) CARGO ACCESSORY MATCHING SYSTEM

(71) Applicant: Cequent Performance Products, Inc., Plymouth, MI (US)

(72) Inventors: Richard W. McCoy, Granger, IN (US); Paul Charles Caruso, Grosse Point, MI (US); Jacob S. Belinky, Carleton, MI (US); Mark Patrick Scruggs, Walled Lake, MI (US)

(73) Assignee: CEQUENT PERFORMANCE PRODUCTS, INC., Plymouth, MI (US)

( * ) Notice: Subject to any disclaimer, the term of this patent is extended or adjusted under 35 U.S.C. 154(b) by 597 days.

(21) Appl. No.: 13/838,200

(22) Filed: Mar. 15, 2013

(65) Prior Publication Data
US 2014/0263512 A1 Sep. 18, 2014

(51) Int. Cl.
*B60R 9/00* (2006.01)
*B60R 7/00* (2006.01)
*B60R 11/00* (2006.01)
*B60R 9/06* (2006.01)

(52) U.S. Cl.
CPC ........... *B60R 9/06* (2013.01); *Y10T 29/49826* (2015.01)

(58) Field of Classification Search
CPC .......... B60D 1/248; B60D 1/36; B60R 1/003; B60R 2022/4875
USPC ....................................................... 224/519
See application file for complete search history.

(56) References Cited

U.S. PATENT DOCUMENTS

| | | | |
|---|---|---|---|
| 5,219,105 A | | 6/1993 | Kravitz |
| 5,525,314 A | * | 6/1996 | Hurson ......................... 422/300 |
| 6,389,337 B1 | | 5/2002 | Kolls |
| 6,406,295 B1 | | 6/2002 | Mahler |
| 6,712,381 B1 | | 3/2004 | Moss |
| 6,788,190 B2 | * | 9/2004 | Bishop ......................... 340/435 |
| 7,591,404 B2 | * | 9/2009 | LeDuc et al. ................. 224/509 |
| 7,676,494 B2 | | 3/2010 | Long et al. |
| 8,195,678 B2 | | 6/2012 | Michalke et al. |
| 2002/0060443 A1 | | 5/2002 | Fandrich et al. |
| 2003/0052472 A1 | * | 3/2003 | Moss et al. ................ 280/415.1 |

(Continued)

FOREIGN PATENT DOCUMENTS

CA 2107745 5/1995

OTHER PUBLICATIONS

International Search Report and the Written Opinion of the International Searching Authority, PCT/US2014/0215232, Aug. 11, 2014.

(Continued)

*Primary Examiner* — Derek Battisti
(74) *Attorney, Agent, or Firm* — McDonald Hopkins LLC

(57) ABSTRACT

A cargo accessory system is shown and described. The cargo accessory system may include a hitch mounting member, and a cargo accessory carrier attached to the hitch mounting member, where the cargo accessory carrier is configured to carry cargo. The cargo accessory system may also include a visual indicator incorporated with the cargo accessory carrier. The visual indicator may include a compatibility indicator identifying at least one hitch receiver to which the hitch member is capable of attaching, and a weight capacity identifying a load capacity of the cargo accessory carrier when the hitch mounting member is attached to the at least one hitch receiver.

22 Claims, 11 Drawing Sheets

(56) References Cited

U.S. PATENT DOCUMENTS

| | | |
|---|---|---|
| 2004/0032112 A1 | 2/2004 | Reese et al. |
| 2005/0261986 A1 | 11/2005 | Haynes et al. |
| 2006/0186131 A1 | 8/2006 | Panning |
| 2006/0186132 A1 | 8/2006 | Panning |
| 2008/0023507 A1* | 1/2008 | Uebler .................. 224/42.2 |
| 2010/0084449 A1* | 4/2010 | Columbia ............... 224/520 |
| 2014/0246467 A1* | 9/2014 | Hein et al. .............. 224/519 |

OTHER PUBLICATIONS

Briggs, J., "How Ball Mounts Work.", Oct. 31, 2008; (retrieved online Jul. 2, 2014), <http://auto-howstuffworks.com/auto-parts/towing/equipment/hitch-accessories/ball-mounts.htm>; p. 3, line 2.

* cited by examiner

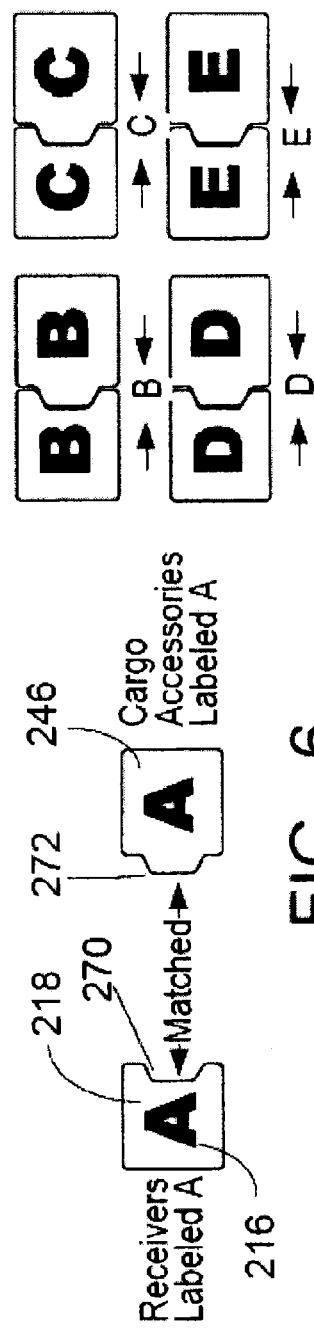
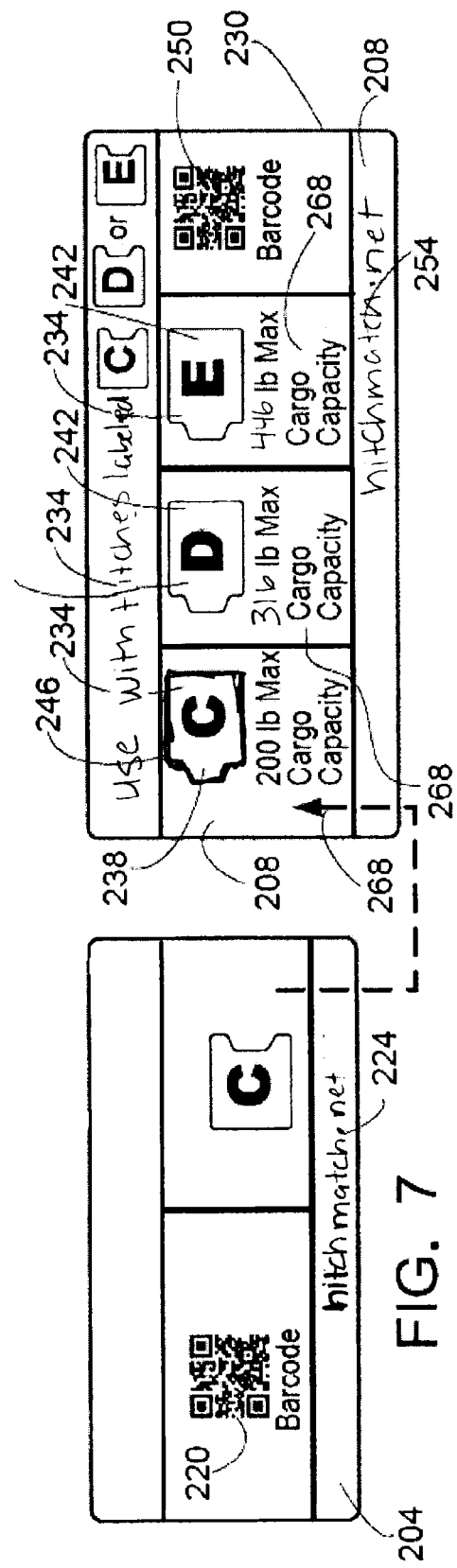
FIG. 6
FIG. 7

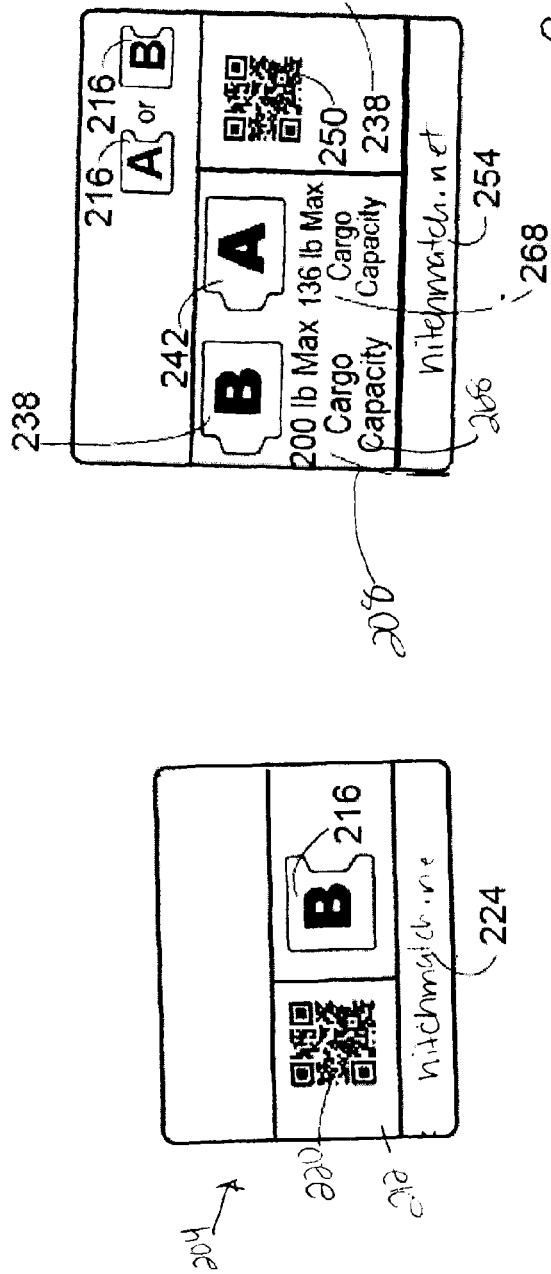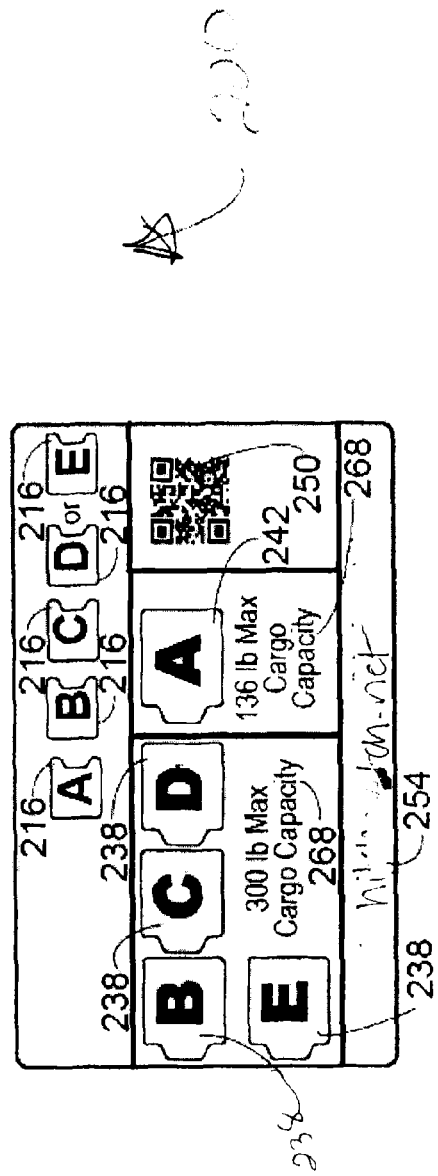
FIG. 9

CARGO ACCESSORY MATCHING SYSTEM

FIELD OF INVENTION

The present invention relates generally to a cargo accessory matching system and, more particularly, to system of matching a cargo accessory with an appropriate hitch receiver.

BACKGROUND

Vehicles are available in many different shapes and sizes. Vehicles, regardless of their shape or size have limits on available cargo space within the vehicle. In order to expand upon this limited cargo space, cargo accessory systems have been developed to create additional cargo capacity for vehicles. These cargo accessories are typically capable of carrying additional items/cargo on exterior portions of vehicles, relieving vehicles of some of their cargo restraints.

Many vehicles utilize hitch receivers attached to the frame of the vehicle and extend immediately below the bumper and from the rear of the vehicle. These hitch receivers were traditionally used to tow towed vehicles. However, to expand the cargo carrying capacity of vehicles, hitch receivers were utilized to secure cargo accessory systems to the vehicle. In fact, many users never use their hitch receivers to tow a vehicle, but instead use it exclusively with cargo accessory systems. These cargo accessory systems operatively attach to a hitch receiver of a vehicle in a variety of ways. Such cargo accessory systems typically extend from the rear of the vehicle and may be used to carry a wide variety of cargo and come in many different configurations.

While the towing capacity (tongue load (vertical weight load) and maximum towed vehicle weight (horizontal weight load)) for towing a towed vehicle of a particular hitch receiver attached to a vehicle is typically known, the appropriate weight capacity for a hitch receiver with a cargo accessory system attached is typically not known. The forces applied to the hitch receiver and cargo accessory system are different than those applied to a hitch receiver towing a towed vehicle. The towing capacity of the hitch receiver is typically defined as it primarily involves lateral push-pull forces. Cargo accessory systems involve different and additional physical forces not otherwise present in towing vehicles or of limited concern in towing vehicles. For example, cargo accessory systems put torque on the hitch receiver, extend in a cantilever fashion out from the hitch receiver creating a moment arm that applies more force, and may allow cargo to be positioned in a manner where additional or varying forces apply to the hitch receiver.

Moreover, the operation of the vehicle causes the cargo accessory system to apply additional forces to the hitch receiver. The vehicle braking, hitting pot holes, and going over speed bumps may double or even triple the force of the load applied to the hitch receiver and cargo accessory system. In many circumstances wheels are not used to bear loads on the cargo accessory systems as is the case of trailers or towed vehicles, forces have to be borne by the hitch receiver, which creates a different set of forces.

Therefore, there is a need for a system that accounts for the various forces applied to the hitch receiver during operation in determining the appropriate cargo carrying capacity of a specific cargo accessory system and the corresponding hitch receiver. Further, there is a need for a system that identifies the applicable cargo carrying capacity of a particular cargo accessory system and a particular hitch receiver. Further still, there is a need for a system that matches the appropriate cargo accessory system with those hitch receivers for which it may be appropriately used.

SUMMARY

A cargo accessory system is shown and described. The cargo accessory system may include a hitch mounting member, and a cargo accessory carrier coupled to the hitch mounting member, wherein the cargo accessory carrier is configured to carry cargo. The cargo accessory system may also include a visual indicator incorporated with at least one of the cargo accessory carrier and the hitch mounting member, the visual indicator indicative of an operational characteristic of the cargo accessory carrier. The visual indicator may include at least one of a compatibility indicator identifying at least one hitch receiver to which the hitch member is capable of being operably attached, and at least one capacity indicator indicative of an operational load capacity of the cargo accessory carrier when the hitch mounting member is attached to a particular hitch receiver.

A hitch match system may include a first visual indicator incorporated with a hitch receiver, where the first visual indicator is indicative of an operational characteristic of the hitch receiver. The hitch match system may also include a second visual indicator incorporated with a cargo accessory carrier configured to operably attach to a mating hitch receiver, where the second visual indicator is indicative of an operational characteristic of the cargo accessory carrier. The second visual indicator may include a compatibility indicator identifying at least one identified hitch receiver to which the cargo accessory carrier is configured to be operably attached, and at least one capacity indicator indicative of an operational load capacity of the cargo accessory carrier when attached to a particular hitch receiver.

A method of matching a hitch receiver with an appropriate cargo accessory carrier may include the steps of identifying at least one mating hitch receiver to which a cargo accessory carrier is configured to be operably attached, and identifying an operational load capacity of the cargo accessory carrier when the cargo accessory carrier is attached to the at least one mating hitch receivers. The method may also include attaching a cargo visual indicator to the cargo accessory carrier, where the cargo visual indicator includes a compatibility indicator identifying the at least one mating hitch receiver and a capacity indicator indicative of the operational load capacity of the cargo accessory carrier attached to the at least one mating hitch receiver.

DESCRIPTION OF THE DRAWINGS

Operation of the invention may be better understood by reference to the following detailed description taken in connection with the following illustrations, wherein:

FIG. 6 is a partial exploded view of a portion of a hitch match system.

FIGS. 7-10 are views of a plurality of labels of a hitch match system.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
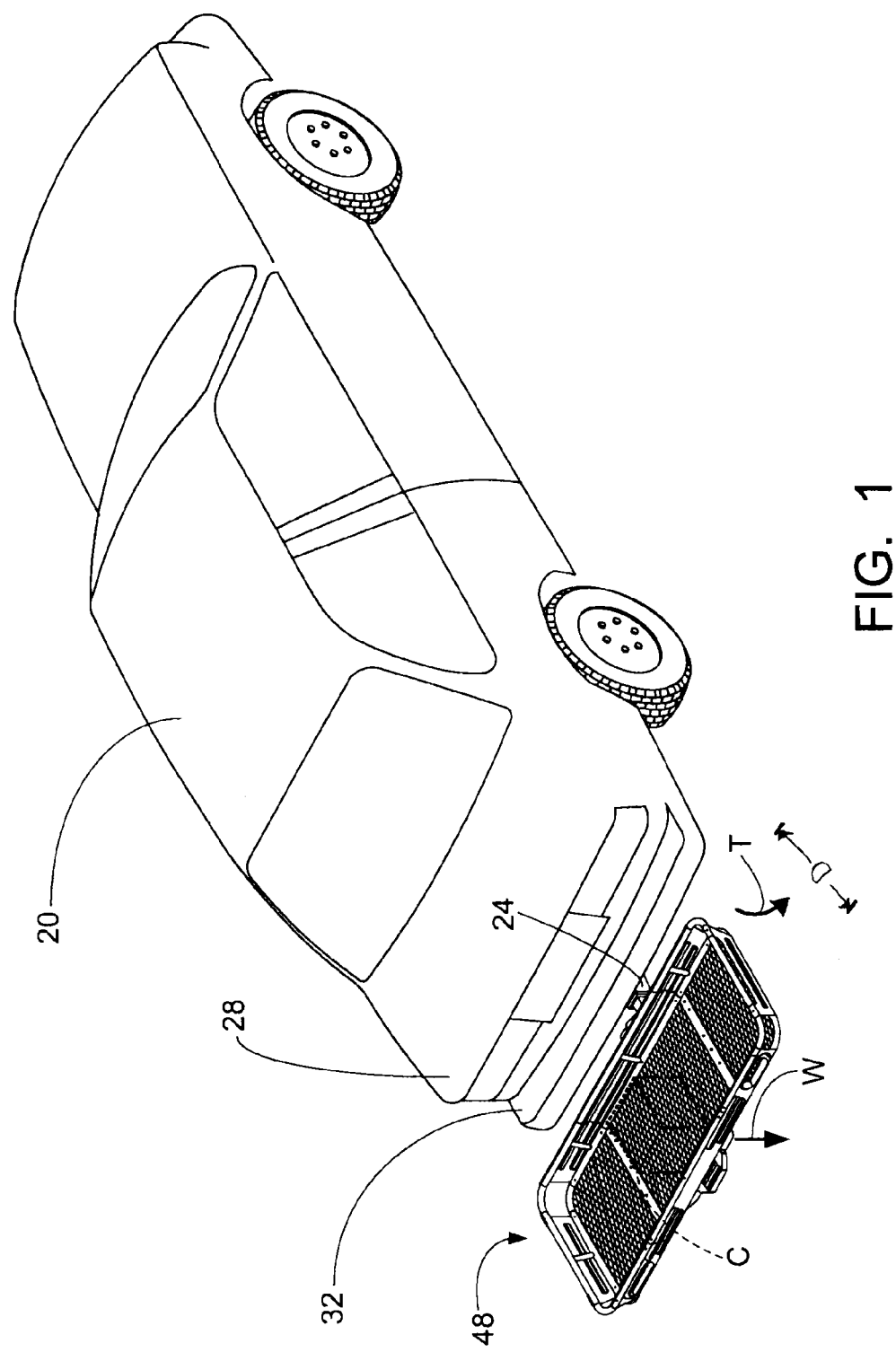
FIG. 1 is a perspective view a cargo accessory selectively attached to a hitch receiver attached to a vehicle.
Figure 2:
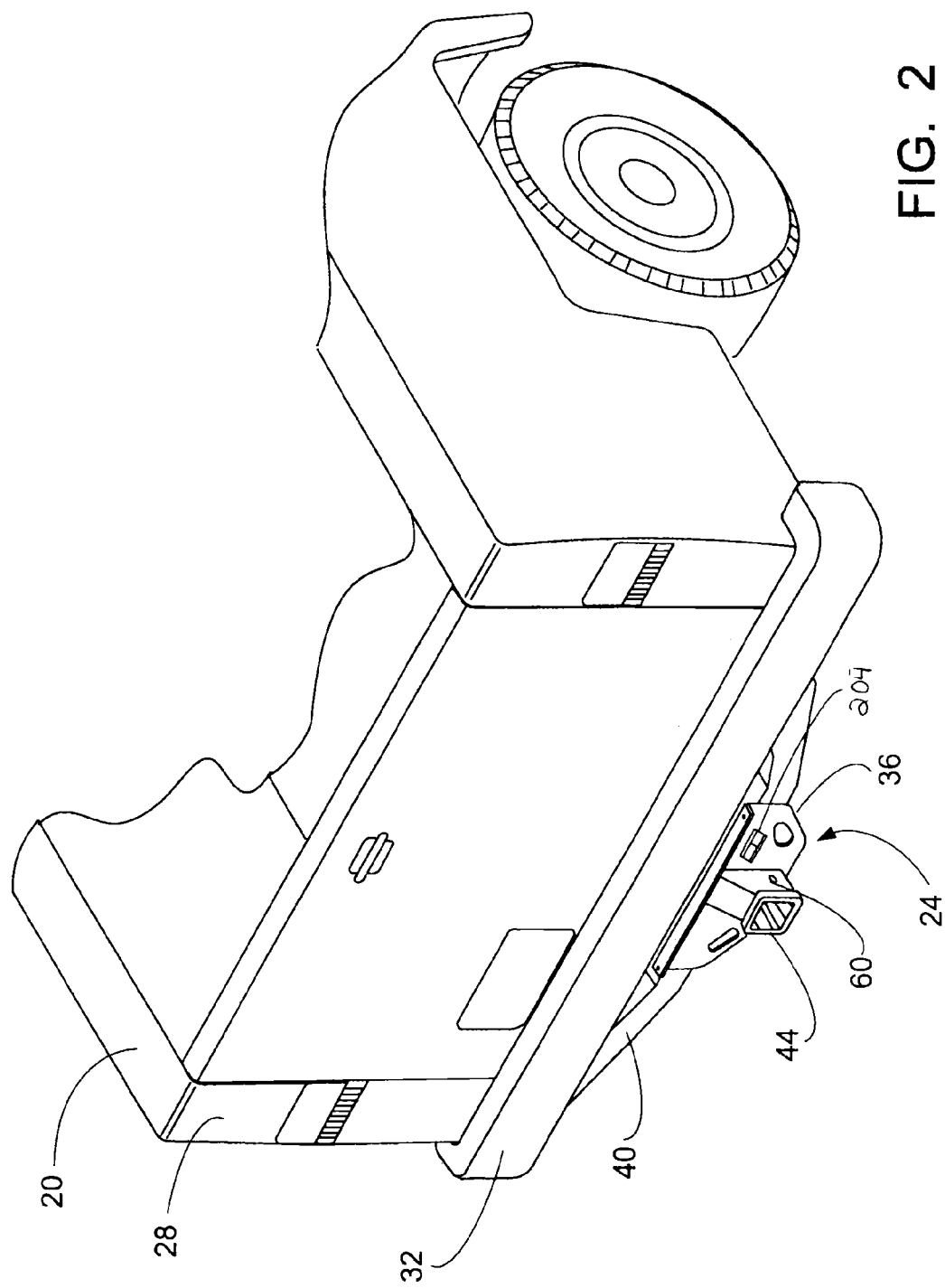
FIG. 2 is a perspective view of a hitch receiver attached to a frame of a vehicle.
Figure 5:
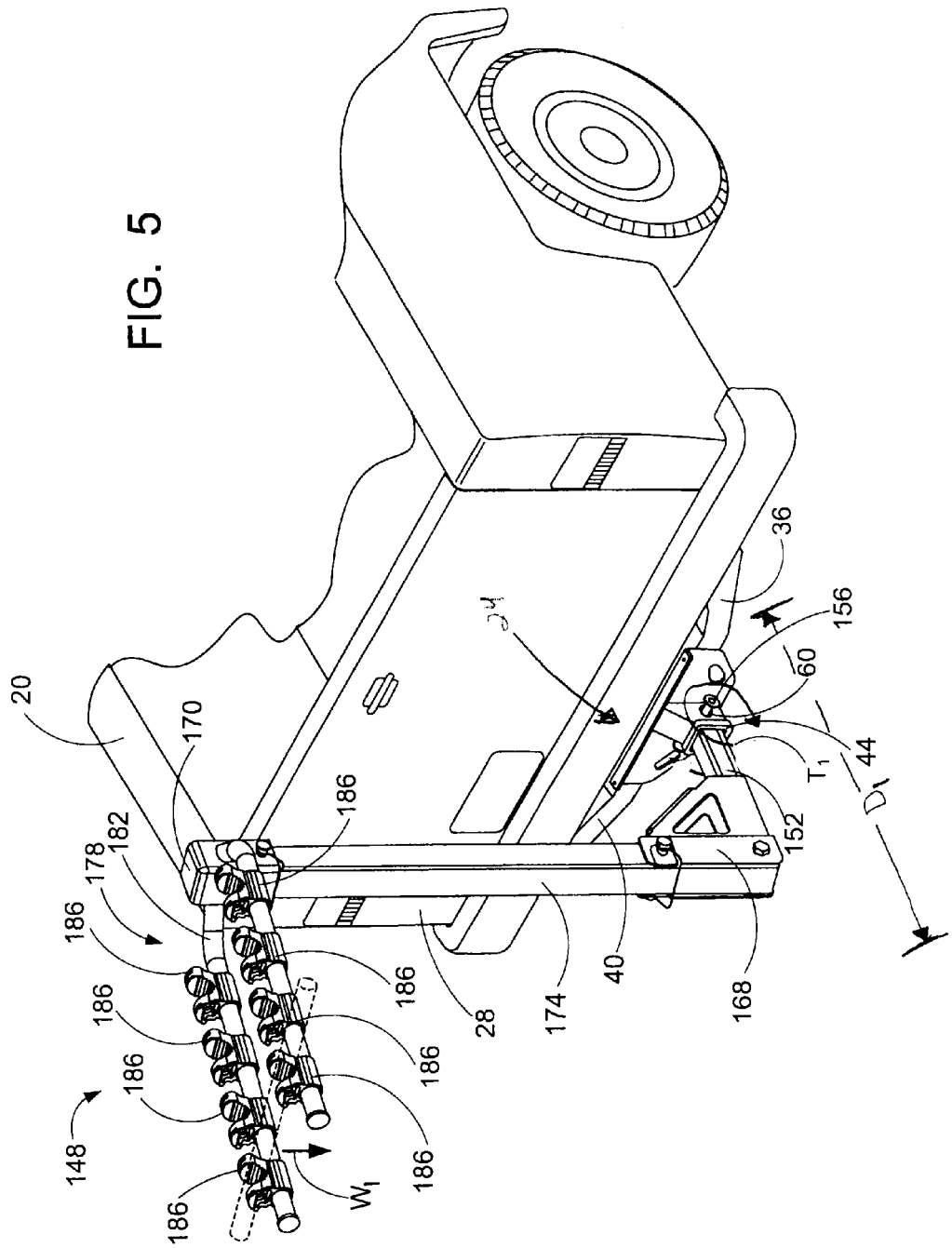
FIG. 5 is a perspective view of embodiments of a cargo accessory selectively attached to a hitch receiver attached to a vehicle.

FIGS. 1, 2 and 5 depict a vehicle 20 having a hitch receiver 24 attached thereto. The hitch receiver 24 may be attached to the vehicle in any appropriate manner, such as by way of a non-limiting example to a frame (not shown) on a rear portion 28 of the vehicle 20. The vehicle 20 may be any type of vehicle, such as a pick-up truck, flat bed truck, a sports utility vehicle, a car, or any other appropriate type of vehicle—the present teachings are not limited to specific vehicles.

As shown in more detail in FIG. 2, the hitch receiver 24 may be secured to the rear portion 28 of the vehicle 20 immediately below a bumper 32 of the vehicle 20. The hitch receiver 24 shown in FIG. 2 is merely an exemplary embodiment of a hitch receiver. Any hitch receiver 24 may be used with the present teachings. Further, the hitch receiver 24 may be attached to the vehicle 20 in any appropriate manner and is not limited to that shown and described. By way of a non-limiting example, the hitch receiver 24 may be attached to a front portion, rear portion, or side portion of the vehicle 20 as is appropriate. The exemplary hitch receiver 24 may include a receiver assembly 36 that may be secured to a portion of a torsion tube 40 that may be attached to the frame (not shown) of the vehicle 20 in any appropriate manner.

The receiver assembly 36 may include a hitch box 44 of any appropriate shape and size. In some embodiments, the hitch box 44 may be generally hollow and have a generally square, rectangular, circular or oval cross-sectional shape. While the hitch receiver 24 is shown as having a generally square or rectangular cross-sectional hitch box 44, any appropriately shaped hitch box 44 may be used, and it not limited to that shown and described. By way of a non-limiting example, the hitch box 44 may be of approximately 1.25 inches (32 mm) in size, which are typically used with Class I/II hitches or may be approximately 2 inches (51 mm) in size, which are typically used with Class III/IV/V hitches. Hitch receiver 24 has predefined operational characteristics that can vary based on the particular hitch receiver. The operational characteristics include, but are not limited to, the dimensional configurations and the loading capacity (e.g., vertical weight capacity and torque loading capacity).

Figure 3:
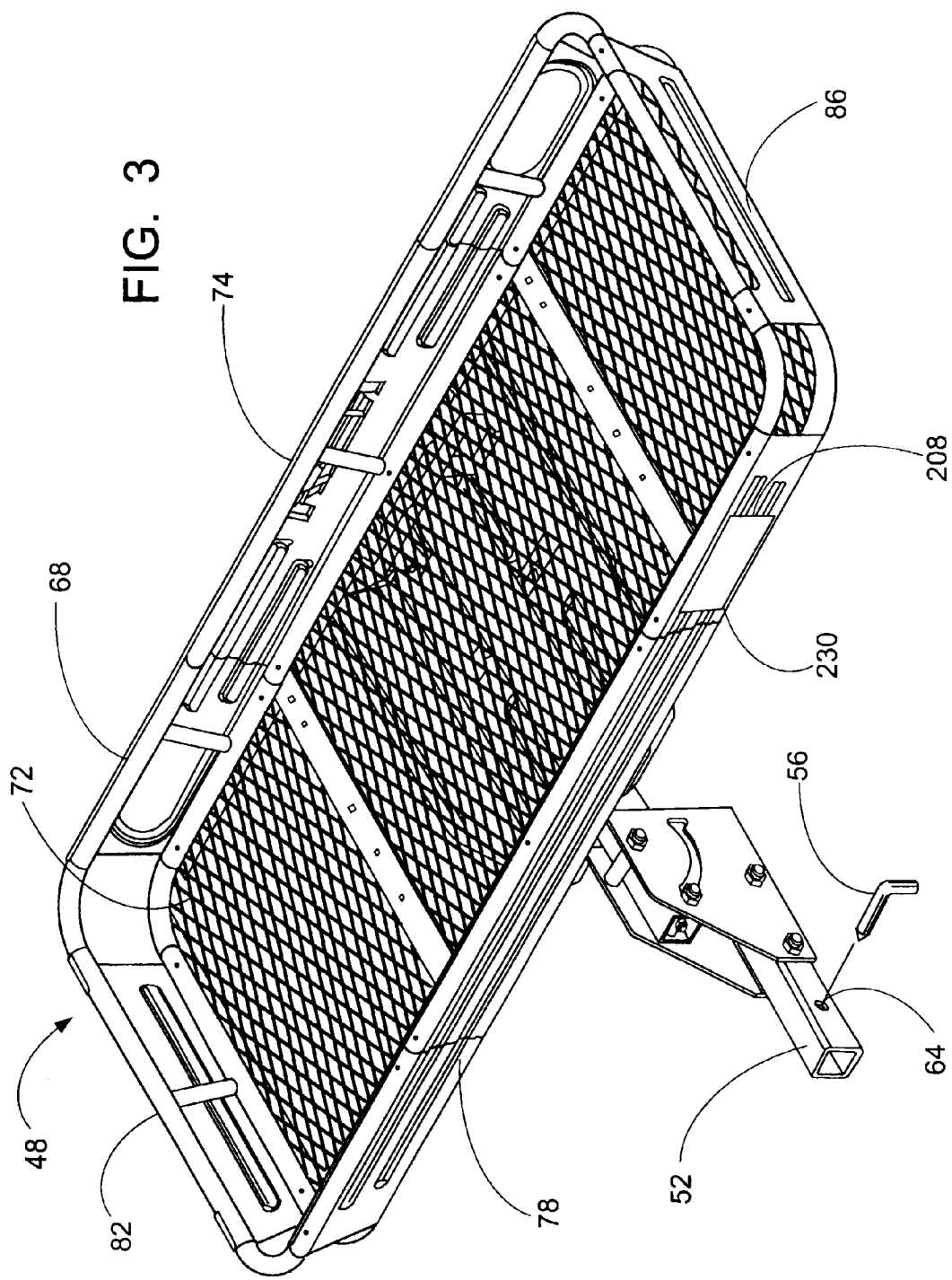
FIG. 3 is a perspective view of embodiments of a cargo accessory.

A cargo accessory system 48, such as the basket shown in FIGS. 1 and 3, may be selectively secured to the hitch receiver 24 in any appropriate manner—the present teachings are not limited to that shown and described. As shown in FIG. 3, the cargo accessory system 48 may include a draw bar 52 that may be capable of selectively attaching to the hitch receiver 24 of the vehicle 20 at any appropriate position on the vehicle 20, such as by way of a non-limiting example, the rear portion 28 of the vehicle 20. The cargo accessory system 48 may, therefore, extend from the rear portion 28 of the vehicle 20.

The draw bar 52 may be shaped and sized to selectively engage the hitch box 44 in any appropriate manner. The draw bar 52 may have a mating cross-sectional shape to that of the hitch box 44, such as a generally square, rectangular, circular, oval or the like. In these embodiments, the draw bar 52 may be selectively received within the hitch box 44 and may be secured therein. The draw bar 52 may be secured to the hitch box 44 in any appropriate manner. By way of a non-limiting example, the draw bar 52 may attach to the hitch box 44 that is approximately 1.25 inches (32 mm) in size, which are typically used with Class I/II hitches or the draw bar 52 may attach to the hitch box 44 that is approximately 2 inches (51 mm) in size, which are typically used with Class III/IV/V hitches.

In some embodiments, the draw bar 52 may be operatively positioned within the hitch box 44. A pin member 56 may be insertable into and through apertures 60 in the hitch box 44 and corresponding apertures 64 in the draw bar 52. The pin member 56 may be shaped and sized to be selectively positionable within and removable from the apertures 60, 64 of the hitch box 44 and draw bar 52, respectively. The pin member 56 may operatively secure the draw bar 52 with the hitch box 44.

To remove the draw bar 52 from the hitch box 44, the pin member 56 may be removed from the apertures 60, 64. Upon removal of the pin member 56, the draw bar 52 may be removed from the hitch box 44. This may result in the cargo accessory system 48 being selectively removable from the hitch receiver 24. In some embodiments, the draw bar 52 may be selectively attached to or removed from the hitch box 44 in any other appropriate manner and the present teachings are not limited to such.

The cargo accessory system 48 may be of any type of cargo carrying accessory system and is not limited to that shown and described. By way of a non-limiting example, the cargo accessory system 48 may include a basket 68, such as one capable of storing and carrying items. Any appropriately configured basket 68 may be used. The present teachings are not limited to that shown and described. The cargo accessory system 48 and the basket 68 are merely exemplary embodiments and should not be considered to be all-inclusive or exclusive. In other embodiments, the cargo accessory system may include, by way of non-limited example, a pod, a bicycle rack, a cooler accessory, a tool box, a grill, a holder for any of the foregoing, or a combination of such features.

In the exemplary embodiments of FIGS. 1 and 3, the basket 68 may include a storage floor 72, a front portion 74, a rear portion 78, and first and second sides 82, 86. The front portion 74 may be attached to the first and second side portions 82, 86 in any appropriate manner. Likewise, the rear portion 78 may be attached to the first and second side portions 82, 86 in any appropriate manner. The rear portion 78 of the basket 68 may be adjacent to the rear portion 28 of the vehicle 20 when the basket 68 is attached to the hitch receiver 24 of the vehicle 20.

As shown in FIG. 1, the cargo accessory system 48 when loaded with cargo C may apply a torque T on the hitch receiver 24. Specifically, a weight of the cargo C, such as in the direction of arrow W, being a distance D from the hitch receiver 24 may produce a moment arm applying a torque T on the hitch receiver 24. The greater the distance D from the hitch receiver 24 the cargo C is positioned on the cargo accessory system 48, the greater the torque T may be at the hitch receiver 24.

Moreover, the operational conditions (e.g., braking, pot holes, speed bumps, acceleration, etc.) of the vehicle 20 may increase the force of the load at the hitch receiver 24. By way of a non-limiting example, these forces may be increased by two or three times the non-operational condition, i.e., a stationary operation. As the vehicle 24 loaded with cargo C on the cargo accessory system 48 drives over pot holes, speed bumps, rough roads, or the like, the torque T applied at the hitch receiver 24 may greatly increase during these instances. This may make it difficult to determine the appropriate operational capacity for the hitch receiver 24 and cargo accessory system 48 based on towing capacity as typically defined.

Additional embodiments of a cargo accessory system according the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired cargo accessory system without departing from the spirit and scope of the present teachings.

Figure 4:
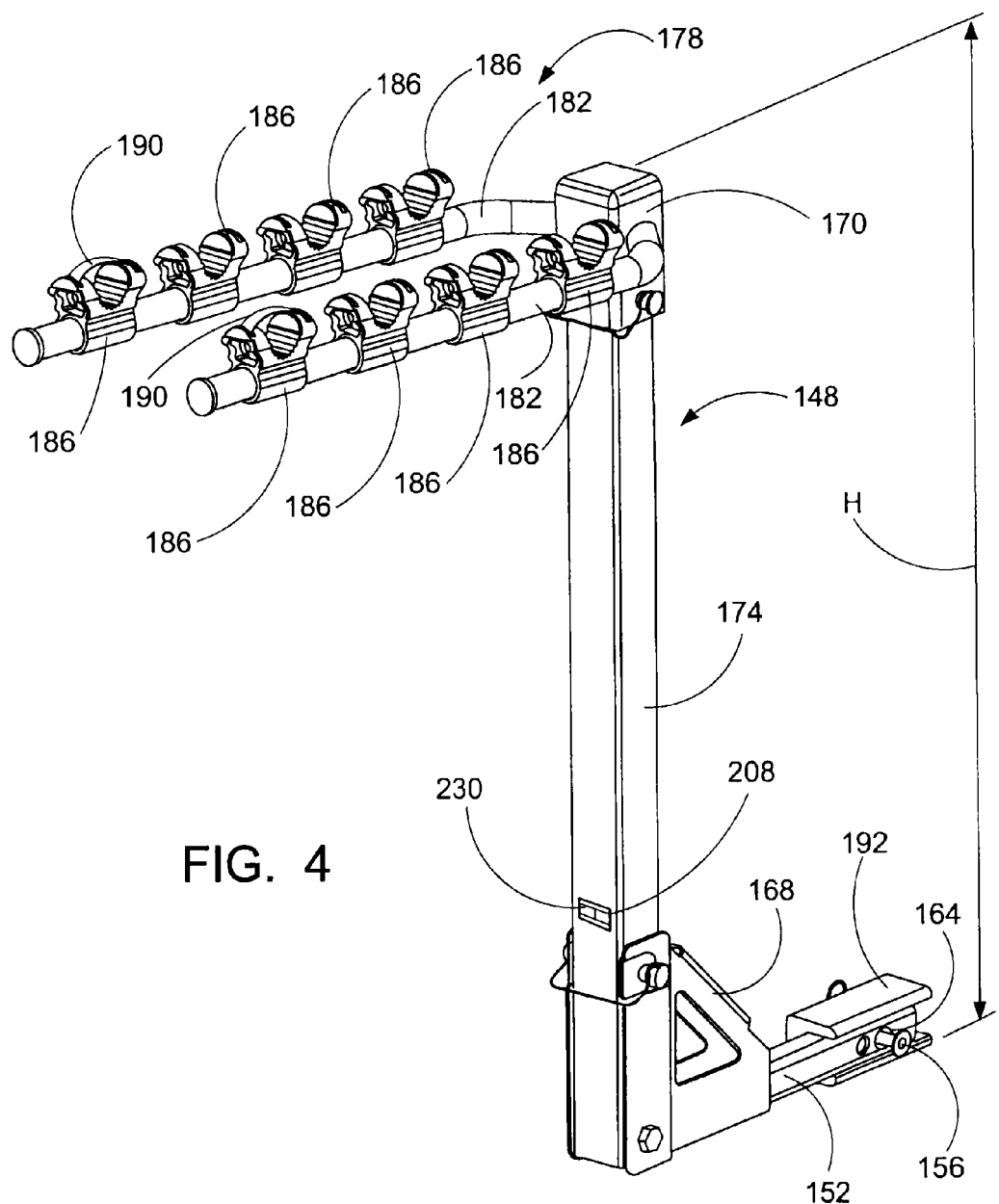
FIG. 4 is perspective view of embodiments of a cargo accessory.

Further exemplary embodiments of a cargo accessory system 148 are shown in FIGS. 4-5. The cargo accessory system 148 may include a draw bar 152 that may be capable of selectively engaging the hitch box 44 of the hitch receiver 24. The receiver assembly 36 and hitch box 44 may be of any appropriate configuration, including, without limitation as described above or may possess other configurations. The present teachings are not limited to a specific hitch receiver 24. The draw bar 152 may be shaped and sized to selectively engage the hitch box 44 in any appropriate manner. In some embodiments, the draw bar 152 may have a mating cross-sectional shape to that of the hitch box 44, such as a generally square, rectangular, circular, oval or the like. The draw bar 152 may be selectively received within the hitch box 44 and may be secured therein in any appropriate manner. By way of a non-limiting example, the draw bar 152 may be positioned within the hitch box 44. A pin member 156 may be insertable into and through the apertures 60 in the hitch box 44 and corresponding apertures 164 in the draw bar 152. The pin member 156 may be shaped and sized to be selectively positionable within the apertures 60, 164 of the hitch box 44 and draw bar 152, respectively.

To remove the draw bar 152 from the hitch box 44, the pin member 156 may be removed from the apertures 60, 164. Upon removal of the pin member 156, the draw bar 152 may be removed from the hitch box 44. This may result in the cargo accessory system 148 being selectively removable from the hitch receiver 24. The draw bar 152 may be selectively attached to or removed from the hitch box 44 in any other appropriate manner and the present teachings are not limited to such.

The exemplary embodiment of the cargo accessory system 148 shown in FIGS. 4-5 may include a support member 168 that may be attached to the draw bar 152 in any appropriate manner. The cargo accessory system 148 may further include a cargo carrying assembly 170 that may be attached to the support member 168 in any appropriate manner. The support member 168 may include a tubular member 174 that may have an appropriate height H to position the cargo carrying assembly 170 in an appropriate operative position relative to the vehicle 20. The tubular member 174 may be generally hollow or may be solid, as appropriate.

By way of a non-limiting example and as shown in FIG. 4, the cargo carrying assembly 170 may include a bike mount 178. In such embodiments, the bike mount 178 may include at least one mount rail 182; such as for example, the bike mount 178 may include two mount rails 182—although the bike mount 178 may include any appropriate number of mount rails 182. The mount rails 182 may be of any appropriate shape or size, such as a generally circular, square or tubular shape. The mount rails 182 may include at least one mounting member 186. There may be any appropriate number of mounting members 186, such as one, two three, etc. As shown in FIG. 4 four pairs of mounting members 186 may be attached to the mount rails 182. The mounting members 186 may be of any appropriate shape or size, such as of a general shape to receive a bicycle component, such as a frame of the bicycle. In such embodiments, the mounting members 186 may be of a generally C-shape. The mounting members 186 may be located at any appropriate position on the mount rails 182, such as equidistantly spaced along each rail 182. In some embodiments, the mounting members 186 may be selectively positionable along the mount rails 182. This may result in the mounting members 186 being selectively positionable along the mount rails 182 to appropriately secure thereto an accessory such as a bicycle.

The bike mount 178 may further include straps 190. As shown in FIG. 4, the bike mount 178 may include a pair of straps 190 attached to each mounting member 186. Although a pair is shown, any appropriate number of straps 190 may be used. A frame of a bicycle (not shown) may be placed on the appropriate mounting member 186 and the straps 190 may be placed over the frame and engaged to secure the bike to the bike mount 178.

The cargo accessory system 148 may include an adapter 192 selectively attached to the draw bar 152. The adapter 192 may be used to operatively attach the draw bar 152 to the hitch box 44 when the draw bar 152 is of an otherwise different configuration or size as the hitch box 44. By way of a non-limiting example, the adapter 192 may be sized such that the draw bar 152 sized and configured to operatively fit the hitch box 44 that is approximately 1.25 inches (32 mm) in size may be operatively attached to the hitch box 44 that is approximately 2 inches (51 mm) in size.

As shown in FIG. 5, the cargo accessory system 148 when loaded with cargo may apply a torque $T_1$ on the hitch receiver 24. Specifically, the weight of the cargo, such as in the direction of arrow $W_1$, being a distance $D_1$ from the hitch receiver 24 may produce a moment arm applying a torque $T_1$ on the hitch receiver 24. The greater the distance $D_1$ from the hitch receiver 24 the cargo is positioned on the cargo accessory system 148, the greater the torque may be at the hitch receiver 24. Further, the operational conditions (e.g., braking, pot holes, speed bumps, acceleration, etc.) of the vehicle 20 may increase the magnitude of the torque load $T_1$ at the hitch receiver 24. This may make it difficult determine the appropriate capacity for the hitch receiver 24 and cargo accessory system 148 using the towing capacities as typically defined.

The torque T shown in FIG. 1 may be substantially equivalent or different from the torque $T_1$ shown in FIG. 5. The differences in torque may relate to many different factors. These factors include, without limitation, the configurations of the cargo accessory system 48 and the cargo accessory system 148 being different, the weights W and $W_1$ being different, and the distances D, and $D_1$ being different. These may all result in the torques T and $T_1$ being different despite being attached to a similarly configured hitch receiver 24.

Further, cargo accessory systems may be configured to operatively attach with different hitch receivers. Cargo accessory systems may be configured to operatively attach to specific configurations and sizes of hitch receivers (e.g., dimensional configuration, loading capacities, etc.). By way of a non-limiting example, the draw bar 52 of the cargo accessory system 48 may be configured to operatively attach to the hitch box 44 of the hitch receiver 24 whereas the draw bar 152 of the cargo accessory system 148 may be configured to operatively attach to a hitch receiver with a hitch box that has a different size and configuration to that of the hitch box 44 and hitch receiver 24. Alternatively, the draw bar 152 of the cargo accessory system 148 may be configured to operatively attach to the hitch box 44 of the hitch receiver 24 whereas the draw bar 52 of the cargo accessory system 48 may be configured to operatively attach to a hitch receiver with a hitch box that has a different size and configuration to that of the hitch box 44 and hitch receiver 24. The hitch receivers may have different operational characteristics. In many instances, an operator uses trial and error to determine if a specific cargo accessory system may operatively attach with a particular hitch receiver, which may cause significant delays and may result in an ill-fitting connection between the cargo accessory system and hitch receiver and/or a mismatch between the loading of the cargo accessory system and the operational characteristics of the hitch receiver.

A hitch match system 200, such as that shown in more detail in FIGS. 6-11, may be used to operatively match a specific cargo accessory system with an appropriately fitting hitch receiver and vice versa. Further, the hitch match system 200 may identify the appropriate load capacity of the operatively attached cargo accessory system for a particular hitch receiver 24. Specifically, the hitch match system 200 may identify specific dimensional configurations of hitch receivers to which a predetermined cargo accessory system may be operatively attached and may identify which dimensional configurations of cargo accessory systems may be operatively attached to a predetermined hitch receiver. Additionally, hitch match system 200 may identify varying operational loading capacities for a particular cargo accessory system when coupled to various hitch receivers. Hitch match system 200 may thereby facilitate the appropriate matching of cargo accessory systems with hitch receivers and the appropriate loading of the cargo accessory system.

The hitch match system 200 may take any appropriate configuration and is not limited to that shown and described. FIGS. 6-11 depict exemplary embodiments of the hitch match system 200 and do not depict the exclusive configuration of such. In some embodiments, the hitch match system 200 may include a first indicator 204 and a second indicator 208. The first indicator 204 may be attached to or otherwise identified in association with a particular hitch receiver 24, an example of which is shown in FIG. 2. The second indicator 208 may be attached to or otherwise identified in association with the applicable cargo accessory system 48, 148, examples of which are shown in FIGS. 3 and 4.

The first indicator 204 may identify or be representative of the operational characteristic of the hitch receiver 24 (e.g., its dimensional configuration and/or its operational or loading capacity). The first indicator 204 may comprise a label 212 attached to the hitch receiver 24 in any appropriate location thereon. In addition to, or in the alternative, the first indicator 204 may be included with the packaging associated with the hitch receiver 24 such as a box, manual or any other material provided at the point of sale for the hitch receiver 24. By way of a non-limiting example, the label 212 of the first indicator 204 may be a sticker adhered to the hitch receiver 24 at a position that an operator may readily identify it and/or where it is readily visible for use. Further, the packaging associated with the hitch receiver 24 may also include the first indicator 204, which may include an image, card, label, brochure, link to a website, or any combination of such.

As shown in FIGS. 7-10, the label 212 may include a predetermined hitch receiver operational characteristic identifier 216. The hitch receiver identifier 216 may be of any appropriate configuration. By way of a non-limiting example, the hitch receiver identifier 216 may be a predetermined letter included on the label 212. The letter may be representative of the operational characteristic of the hitch receiver 24, including the size and configuration of the hitch box 44 to which an appropriate cargo accessory system may operatively attach and the loading capacity of the hitch receiver 24. The hitch receiver identifier 216 may alternatively or in addition be of a predetermined color, i.e., it may be color coded to assist an operator in identifying the hitch receiver identifier 216. By way of a non-limiting example, the hitch receiver identifier 216 may include a letter such as E and/or may be of a predetermined color, such as purple, which may be associated with the letter E. Other hitch receivers may utilize a hitch receiver identifier 216 that may include another predetermined letter, such as A, B, C or D and/or may utilize another predetermined color which may be specifically associated with each of these letters, non-limiting examples of which are shown in FIGS. 6-11.

The hitch receiver identifier 216 may be generally circumscribed by any appropriate receiver icon 218. The receiver icon 218 may be of any appropriate shape and size and may be utilized to help an operator quickly identify the hitch receiver identifier 216 as being associated with the hitch receiver 24 as opposed to a cargo accessory system. The receiver icon 218 may be complementary to an icon associated with the cargo accessory system. The receiver icon 218 depicted in the drawings is merely an exemplary embodiment of such. The present teachings are not limited to a predetermined shape and size of receiver icon, any appropriately shaped and sized receiver icon 218 may be used without departing from the present teachings. Further, the hitch match system 200 may not in some embodiments utilize the receiver icon 218.

The label 212 may also include additional information regarding the hitch receiver 24, including, without limitation information regarding the hitch match system 200, the cargo accessory systems operatively attachable to the hitch receiver 24 and the like. By way of a non-limiting example, the label 212 may include a matrix barcode 220, such as a Quick Response Code or QR Code. The QR code 220 may provide access to additional information, including, without limitation information regarding the hitch match system 200, the manufacturer of the hitch receiver 24, the hitch receiver 24 and the like. In such embodiments, the operator may utilize a smartphone, tablet or any appropriate device to access the additional information by scanning the QR code

220. Once the QR code 220 is scanned, the smartphone or tablet may automatically access such additional information for the operator, such as through an Internet website.

The label 212 may also include a uniform resources locator (URL) 224 to an Internet website that may include additional information about the regarding the hitch receiver 24, the hitch match system 200, the cargo accessory systems operatively attachable to the hitch receiver 24, the manufacturer of the hitch receiver 24 and the like. The Internet website may also include details regarding the hitch match system 200 and how it operates. The Internet website may further provide access to lists of hitch receivers and cargo accessory systems that may operatively match each other. The operator may use this information to match appropriate cargo accessory systems to use with a particular hitch receiver attached to the operator's vehicle. The Internet website may also include tips regarding the use of the cargo accessory system or the hitch receiver, or any other information relevant to the hitch match system 200, the hitch receiver 24 or the applicable cargo accessory system. The URL 224 may direct the operator to the same or different Internet website as the QR code 220.

The second indicator 208 may identify or be representative of the operational characteristics (e.g., dimensional configuration and loading capacities) of the cargo accessory system 48, 148. The second indicator 208 may comprise a label 230 attached to the cargo accessory system 48, 148 in any appropriate location thereon. Examples of this are shown in FIGS. 3 and 4. In addition to, or in the alternative, the second indicator 208 may be included with the packaging associated with the cargo accessory system 48, 148 such as a box, manual or any other material provided at the point of sale for the cargo accessory system 48, 148. By way of a non-limiting example, the label 230 of the second indicator 208 may be a sticker adhered to the cargo accessory system 48, 148 at a position that an operator may readily identify it such as at or near a shank thereof or on the rear portion 78 thereof or where it is readily visible. Further, the packaging associated with the cargo accessory system may also include the second indicator 208, which may include an image, a card, label, brochure, link to a website, or any combination of such.

As shown in FIGS. 7-10, the label 230 may include at least one predetermined cargo accessory system operational characteristic identifier 234. As previously indicated, a cargo accessory system 48, 148 may be capable of operatively attaching to a plurality of hitch receivers having the same or differing operational characteristics. While the cargo accessory system 48, 148 may be specifically configured to fit with a particular dimensional configuration of hitch receiver, it may fit with other hitch receivers having a same or different dimensional configuration and/or loading capacities. In such embodiments, the label 230 may include a plurality of predetermined cargo accessory identifiers 234. The plurality of predetermined cargo accessory identifiers 234 may each be associated with one of a plurality of hitch receiver identifiers 216 to which the cargo accessory system 48, 148 may be operatively connected. In such embodiments, the plurality of hitch receiver identifiers 216 may be representative of differing operational characteristic hitch receivers 24.

Figure 10:
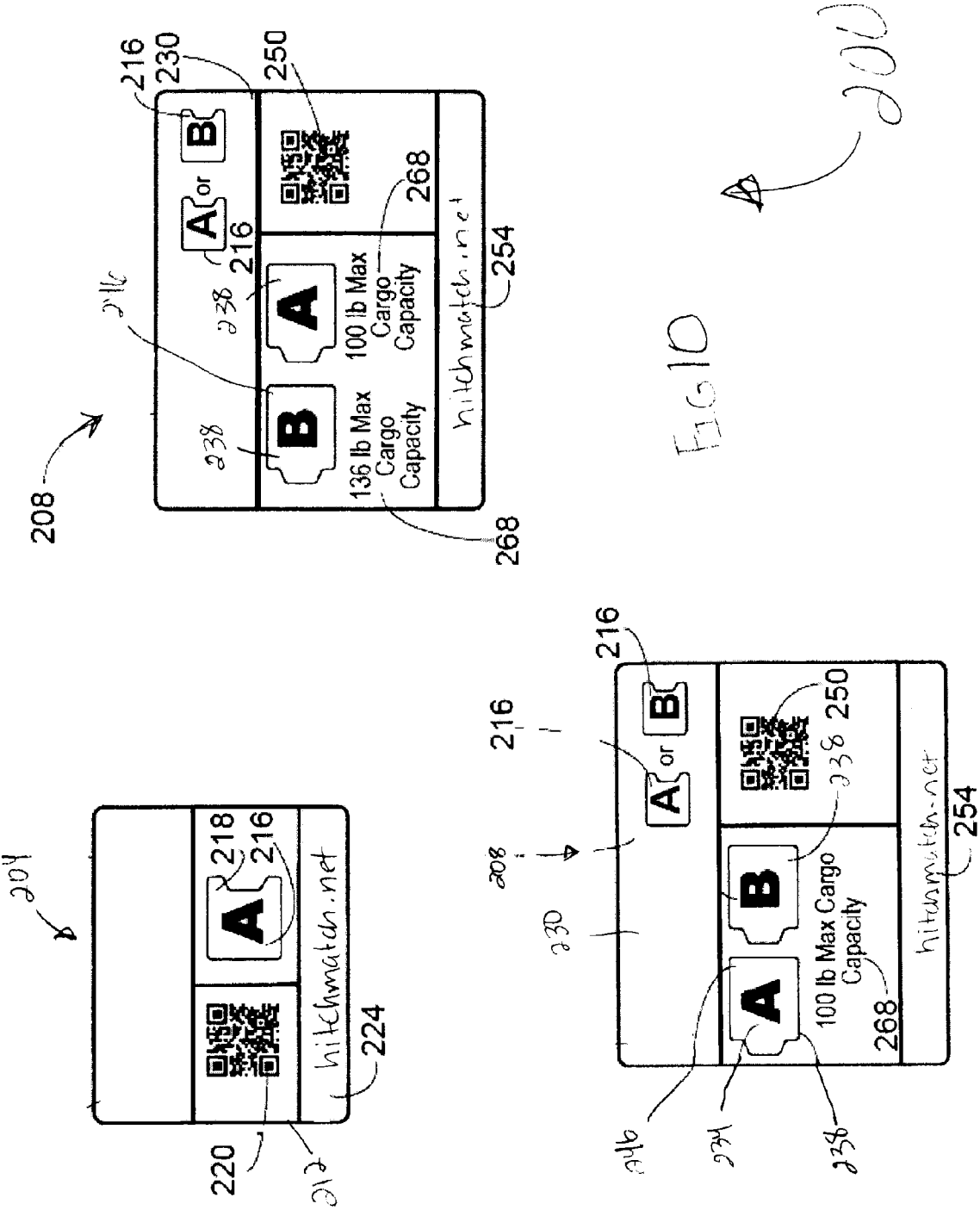

The second label 230 or, more specifically, the predetermined cargo accessory identifiers 234, may include at least one primary cargo accessory identifier 238. The primary cargo accessory identifier 238 may indicate the particular type of hitch receiver with which the accessory cargo system was primarily designated to be used. This is not intended to be indicative of the only hitch receiver with which it may be operatively used. By way of a non-limiting example, the primary cargo accessory identifier 238 may indicate the hitch receiver to which the cargo accessory system once attached allows for a maximum cargo capacity, is easy to attach to, or any other predetermined characteristic associated with the attachment thereof. In some embodiments, such as shown in FIGS. 9-10, the second label 230 may include a plurality of primary cargo accessory identifiers 238 as the applicable cargo accessory system 48, 148 may be configured primarily be operatively attach to a plurality of different sized or configured hitch receivers. The primary cargo accessory identifier(s) 238 may be in a segmented or isolated portion of second label 230 and/or may be of a greater size or prominence than a secondary indicator (if present), by way of non-limiting example.

The second label 230 or, more specifically, the predetermined cargo accessory identifiers 234, may further include one or more secondary cargo accessory identifier 242 that may indicate other hitch receivers to which the cargo accessory system may be selectively and operatively attached. These secondary cargo accessory identifiers 242 may indicate hitch receivers to which the cargo accessory system 48, 148 may operatively attach to that may result in a cargo capacity that is different (greater or lesser) than that of cargo accessory system 48, 148 when attached to the hitch receiver of the primary cargo accessory identifier 238. The second label 230 may include a plurality of secondary cargo accessory identifiers 242 or a single secondary cargo accessory identifier 242.

The cargo accessory identifier 234 may be of any appropriate configuration. By way of a non-limiting example, the cargo accessory identifier 234 may be a predetermined letter included on the second label 230. The letter may be representative of the dimensional configuration of the cargo accessory system 48, 148, and may be indicative of a complementary operational characteristic of a hitch receiver to which the cargo accessory system 48, 148 may operatively attach. The cargo accessory identifier 234 may also be of a predetermined color, i.e., it may alternatively or in addition be of a predetermined color, i.e., color coded to assist an operator in identifying the cargo accessory identifier 234. By way of a non-limiting example, the cargo accessory identifier 234 may include a letter such as E and/or may be of a predetermined color, such as purple, which may be associated with the letter E. Other cargo accessory systems may utilize cargo accessory identifier 234 that may include another predetermined letter, such as A, B, C or D and/or may utilize another predetermined color which may be specifically associated with each of these letters, non-limiting examples of which are shown in FIGS. 6-11 The cargo accessory identifiers may use the same letters and/or colors of hitch receiver identifiers.

The cargo accessory identifier 234 may be generally circumscribed by any appropriate cargo accessory icon 246. The cargo accessory icon 246 may be of any appropriate shape and size and may be utilized to help an operator quickly identify the cargo accessory identifier 234 as being associated with the cargo accessory system as opposed to a hitch receiver. Cargo accessory icon 246 may be complementary to hitch receiver icon 218. The cargo accessory icon depicted in the drawings is merely an exemplary embodiment of such. The present teachings are not limited to a predetermined shape and size of cargo accessory icon, any appropriately shaped and sized cargo accessory icon 246 may be used without departing from the present teachings.

Further, the cargo accessory icon 246 may or may not be utilized on the second label 230 without departing from the present teachings.

Further, as shown in FIG. 6, the configuration of the receiver icon 218 and the cargo accessory icon 246 may be such that they appear to matingly engage with one another. Specifically, the receiver icon 218 may include a slot 270 that may be shaped and sized to engage with a protrusion 272 of the cargo accessory icon 246. It should be understood that the receiver icon 218 and the cargo accessory icon 246 may be of any appropriate shape and size and are not limited to that shown and described herein. This configuration may help an operator visualize the association between the first and second indicators 204, 208.

The second label 230 may also include additional information regarding the cargo accessory system 48, 148, the hitch match system 200, the hitch receiver 24, hitch receivers to which the cargo accessory system may operatively attach and the like. By way of a non-limiting example, the second label 230 may include a second matrix barcode 250, such as a Quick Response Code or QR Code. The QR code 250 may provide access to such additional information. The operator may utilize a smartphone, tablet or similar apparatus to access the additional information by scanning the QR code 250. Once the QR code 250 is scanned, the smartphone or table may automatically access such additional information for the operator.

The second label 230 may also include a uniform resources locator 254 to an Internet website that may include additional information about the regarding the cargo accessory system 48, 148, the hitch match system 200, the hitch receiver 24, hitch receivers to which the cargo accessory system may operatively attach and the like. The Internet website may provide access to lists of hitch receivers and cargo accessory systems that may match such. The operator may be able to match appropriate cargo accessory systems to use with a hitch receiver attached to the operator's vehicle. The Internet website may also include tips regarding the use of the cargo accessory system or the hitch receiver. The URL 254 may direct an operator to an Internet website that is the same or different from that of the QR code 250.

Further, in some embodiments the second indicator 208 may include a usage statement 258 that may describe a function of the hitch match system 200. By way of non-limiting example, usage statement 258 may indicate the appropriate hitch receivers 24 to which the particular cargo accessory system 48, 148 may be operatively attached.

Figure 8:
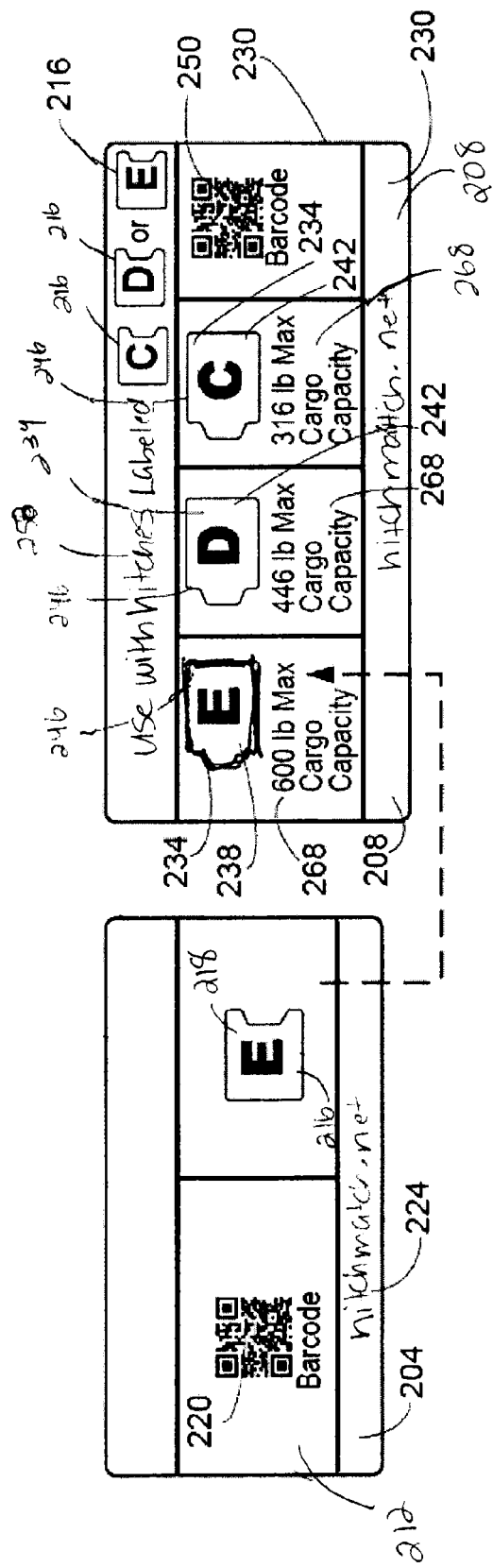

As stated above, the cargo accessory system 48, 148 may be capable of operatively attaching to a plurality of different hitch receivers. In that case, the second label 230 may include a plurality of cargo accessory identifiers 234. Each particular cargo accessory system 48, 148 may have an operational loading capacity, which may be a maximum weight (or some other weight) of cargo or accessories that can be coupled thereto or by way of non-limiting example. The operational loading capacity of the cargo accessory systems can varying from one another. Additionally, the various hitch receivers 24 to which the cargo accessory systems 48, 148 can be operatively attached may also have varying operational characteristics, such as loading capacities. As a result, the operational loading capacity of a particular cargo accessory system may vary (greater or lesser) based on the particular receiver hitch to which it is attached. Hitch match system 200 may account for these varying operational characteristics of the hitch receivers 24 and the cargo accessory systems 48, 148. By way of non-limiting example, hitch match system 200 may provide a loading capacity for a particular cargo accessory system 48, 148 when coupled to a particular hitch receiver 24. Second label 230 may include at least one operational load capacity indicator 268. The capacity indicator 268 may be a numeric value indicating the appropriate cargo weight capacity of the cargo accessory system when paired with a particular the hitch receiver (i.e., the numeric value is associated with a particular cargo accessory indicator 234). The capacity indicator 268 may also identify the appropriate loading conditions of the cargo accessory system 48, 148 when operatively secured with the hitch receiver 24. As the second label 230 may include a plurality of cargo accessory identifiers 234, such as by way of a non-limiting example, the primary cargo accessory identifier 238 and the pair of secondary cargo accessory identifiers 242 as shown in FIGS. 7-8, a plurality of capacity indicators 268 may be included. Each of the capacity indicators 268 may identify the load capacity of a predetermined cargo accessory system being operatively attached to a particular hitch receiver or receivers, as indicated by its association with a particular (or multiple) cargo accessory indicator 234. Each of the plurality of capacity indicators 268 may indicate the same load capacity or different load capacities. In some situations, the capacity indicators 268 associated with the secondary cargo accessory identifiers 242 may result in the cargo accessory system 148, 48 having a reduced or greater operational load capacity when used with those other hitch receivers. The listed capacity indicators 268 take into account the loading that will be imparted on both the particular hitch receiver and the particular cargo accessory system based on the operational characteristics of each.

Utilizing the hitch match system 200, the capacity indicator 268 may be based upon any appropriate factors of the cargo accessory system 48, 148, the hitch receiver 24 and the manner of attachment between the two. Using these factors, the capacity indicator 268 may define the maximum weight capacities for each cargo accessory system for a particular hitch receiver. As shown in FIGS. 7-10, the number under the cargo accessory system configuration identifiers 234 may indicate the cargo capacity of that cargo accessory system on a matching hitch receiver. By way of a non-limiting example, as shown in FIG. 8, the cargo accessory system 48, 148, identified as having E for its cargo accessory system configuration identifier 234, attached to the hitch receiver 24 identified as having E as its hitch receiver configuration identifier 216, may have a load capacity of 600 pounds. If, however, the cargo accessory system is moved to a vehicle with the hitch receiver configuration identifier 216 labeled C, the load capacity may be about 316 pounds.

The hitch match system 200 in determining which cargo accessory system matches which hitch receiver and the associated capacities may analyze, by way of non-limiting example, at least any one of the following: hitch receiver materials and design, the hitch receiver vertical load/torque capacity, the cargo accessory system materials and design, load carrying capacity of the cargo accessory system, hitch box configuration and size—including use of an accessory adapter, cargo accessory system dimensions—length and height, distance from the cargo accessory system center of gravity to the hitch receiver, moment arm length and leverage, alternate cargo accessory system configurations—swinging, folding, G-forces associated with braking, acceleration, potholes, speed bumps, and rough roads. These items may be analyzed and the applicable load capacity identified from such information.

It should be understood that while the first and second indicators 204, 208 are shown and described as letters included on a sticker adhered to the hitch receiver 24 and cargo accessory system 48, 148, the present teachings are not limited to stickers. Any appropriate indicator may be used without departing from the present teachings. By way of a non-limiting example, the first indicator 204 may be scribed directly on the hitch receiver 24 such as through an engraving process, may be included on the product packaging, on product literature, on an accessible (public or private) Internet website, on a hang tag, or any combination of such. In some embodiments, the first indicator 204 may be provided in multiple manners, e.g., on a label adhered to the hitch receiver 24, on an Internet website, on a card provided with the hitch receiver 24 and on the applicable product packaging. By way of a non-limiting example, the first indicator 204 may be attached to the hitch receiver 24 in close proximity to the tow rating label.

Similarly, the second indicator 208 may be scribed directly on the cargo accessory system 48, 148 such as through an engraving process, may be included on the product packaging, on product literature, on an accessible (public or private) Internet website, on a hang tag, or any combination of such. In some embodiments, the second indicator 208 may be provided in multiple manners, e.g., on a label adhered to the cargo accessory system 48, 148, on an Internet website, on a card provided with the cargo accessory system 48, 148 and on the applicable product packaging.

Figure 11:
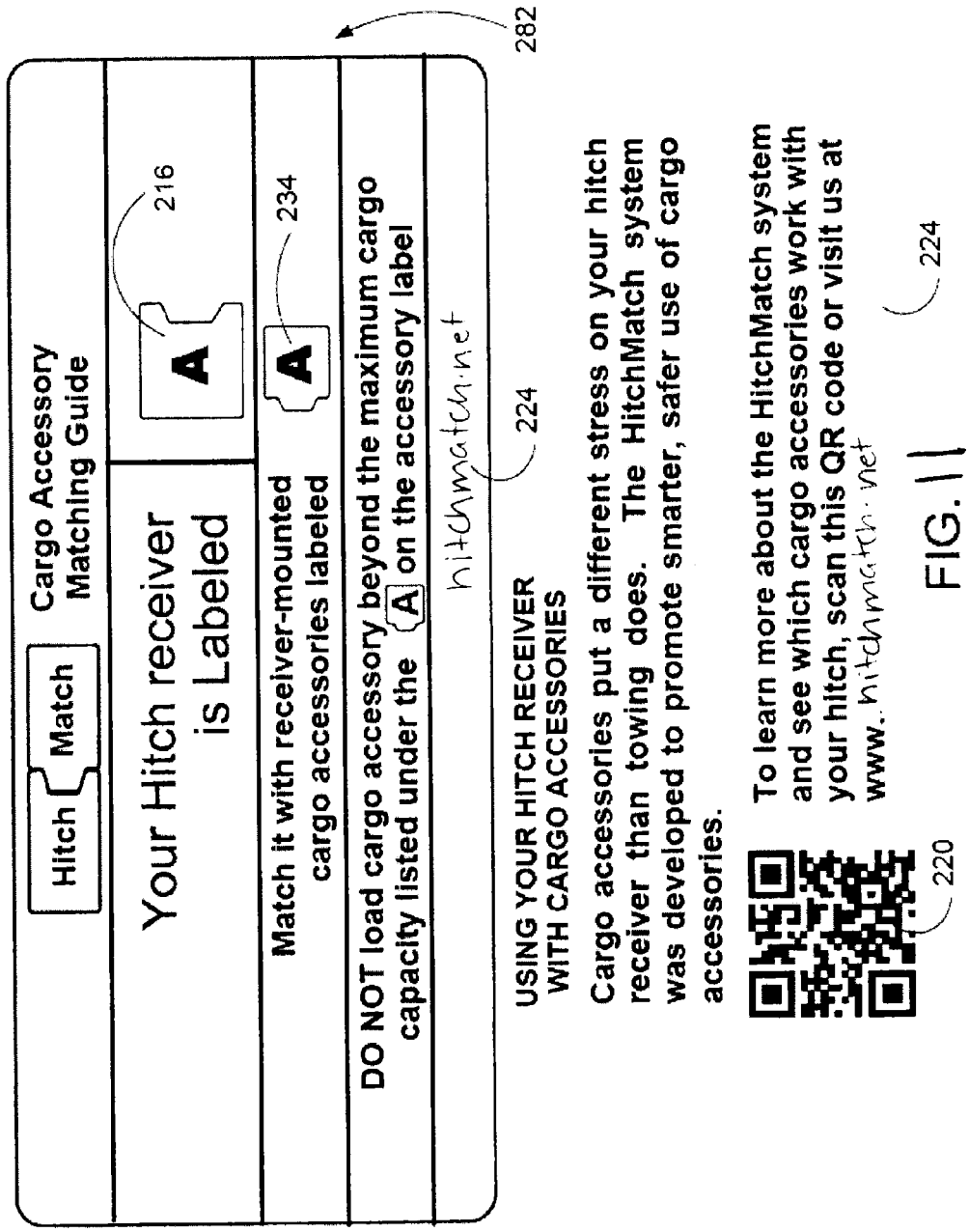
FIG. 11 is a single view of a front and back of a card of a hitch match system.
Figure 12:
FIGS. 12-15 are views of a plurality of labels of a hitch match system.
Figure 13:
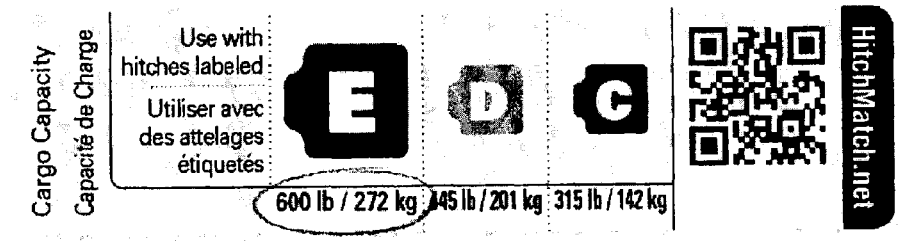
Figure 14:
Figure 15:
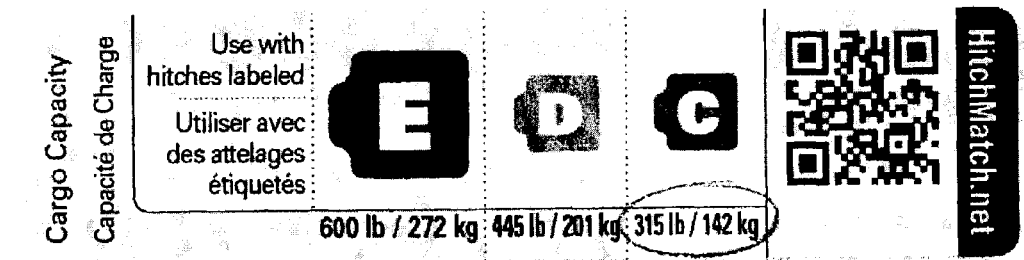

Further, the hitch match system 200 may include a card 282, such as that shown in FIG. 11 that may be included with a hitch receiver 24, the cargo accessory system 48, 148 or both. The card 282 may be an easy reference guide the operator can keep within his or her vehicle. The operator may take the card 282 with him or her when purchasing a hitch receiver or a cargo accessory system, as applicable. This may assist the operator with identifying and purchasing the appropriate cargo accessory system 48, 148 for his or her hitch receiver 24 or the appropriate hitch receiver 24 for his or her cargo accessory system 48, 148.

As shown in FIG. 11, the card 282 may include at least one predetermined hitch receiver configuration identifier 216 and the corresponding cargo accessory system configuration identifier 234. The card 282 may also include a matrix barcode 220, such as a Quick Response Code or QR Code, and a uniform resources locator 224 to an Internet website that may include additional information about the regarding the hitch receiver 24, the hitch match system 200, the cargo accessory systems operatively attachable to the hitch receiver 24, the manufacturer of the hitch receiver 24 and the like. The card 282 may also include additional details regarding the hitch match system 200.

In operation, the operator may have attached to his or her vehicle a hitch receiver, such as the hitch receiver 24. The hitch receiver 24 of the operator may include a portion of the hitch match system 200. Specifically, the hitch receiver 24 may identify the hitch receiver configuration identifier 216 associated with such, such as the letter E shown in FIG. 8. When the operator desires to attach a cargo accessory system such as either of the cargo accessory systems 48, 148, the operator may utilize the hitch match system 200 to attach the appropriate cargo accessory system. In such embodiments, the operator may locate and identify a cargo accessory system that includes the cargo accessory system configuration identifier 234 that is associated with the hitch receiver configuration identifier 216, such as the letter E. The operator, based upon the hitch match system 200 knows that such cargo accessory system is operatively attachable to the hitch receiver 24. Further, the hitch match system 200 may identify the cargo carrying capacity of the cargo accessory system when attached to that specific hitch receiver. As shown in FIG. 8 for example, the load capacity indicator 268 identifies that the load capacity of the cargo accessory system when attached to the hitch receiver is 600 pounds. The operator can then confidently load the cargo accessory system with knowledge of its load capacity.

The operator may also utilize the hitch match system 200 to associate his or her cargo carrying accessory with a hitch receiver. For example, if the operator purchases a new vehicle and wishes to add a hitch receiver to it that will operatively fit the cargo carrying accessory he or she already possess the operator may utilize the hitch match system 200. The cargo carrying accessory may include the cargo accessory system configuration identifier 234. The operator may shop and find a hitch receiver that includes the hitch receiver configuration identifier 216 matching the cargo accessory system configuration identifier 234 of his or her cargo accessory system. This may help the operator ensure that he or she has purchased the appropriate hitch receiver.

Further, the operator may utilize the QR codes 220, 250, the URL 224, 254 of the hitch match system 200 to find more information about the hitch receiver, the cargo accessory system, operating either or both, and any other relevant information provided. The hitch match system 200 may provide easy access to this additional information and access to the information long after purchase of the hitch receiver or cargo accessory system.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A cargo accessory system comprising:
  a hitch mounting member;
  a cargo accessory carrier coupled to the hitch mounting member, wherein the cargo accessory carrier is configured to carry cargo; and
  a visual indicator incorporated with at least one of the cargo accessory carrier and the hitch mounting member, the visual indicator indicative of an operational characteristic of the cargo accessory carrier, the visual indicator comprising:
    a compatibility indicator identifying at least one hitch receiver to which the hitch member is capable of being operably attached; and
    at least one capacity indicator indicative of an operational load capacity of the cargo accessory carrier when the hitch mounting member is attached to the at least one hitch receiver.

2. The cargo accessory system of claim 1, further comprising a hitch receiver having a hitch visual indicator incorporated with the hitch receiver, wherein the hitch visual indicator includes an indication of an operational characteristic of the hitch receiver.

3. The cargo accessory system of claim 2, wherein the compatibility indicator of the visual indicator is associated with a dimensional configuration of the hitch mounting member and the visual indicator incorporated with the hitch receiver is associated with a dimensional configuration of the hitch receiver.

4. The cargo accessory system of claim 2, wherein the compatibility indicator is a first letter and the hitch visual indicator is a second letter whereby matching the first and second letters indicates the hitch mounting member is operatively attachable to the hitch receiver.

5. The cargo accessory system of claim 4, wherein the visual indicator is a label adhered to either of the cargo accessory carrier or the hitch mounting member.

6. The cargo accessory system of claim 5, wherein the hitch visual indicator is a label adhered to the hitch receiver.

7. The cargo accessory system of claim 1, wherein the hitch mounting member is configured to operatively attach a plurality of hitch receivers.

8. The cargo accessory system of claim 7, wherein the visual indicator includes a plurality of different compatibility indicators associated with a dimensional configuration of the hitch mounting member and identifies the plurality of hitch receivers to which the hitch mounting member is configured to attach.

9. The cargo accessory system of claim 1, wherein the at least one capacity indicator includes a plurality of capacity indicators associated with different hitch receivers to which the hitch mounting member may be operatively coupled.

10. The cargo accessory system of claim 9, wherein the plurality of capacity indicators are different from each other.

11. The cargo accessory system of claim 1, wherein the visual indicator includes a plurality of different compatibility indicators and the at least one capacity indictor is associated with multiple ones of the compatibility indicators.

12. The cargo accessory system of claim 1, wherein the visual indicator includes a plurality of different compatibility indicators, the at least one capacity indicator is one of a plurality of capacity indicators and each capacity indicator is associated with one or more of the compatibility indicators.

13. A hitch match system comprising:
   a first visual indicator incorporated with a hitch receiver, wherein the first visual indicator is indicative of an operational characteristic of the hitch receiver; and
   a second visual indicator incorporated with a cargo accessory carrier configured to operably attach to the hitch receiver, wherein the second visual indicator is indicative of an operational characteristic of the cargo accessory carrier, the second visual indicator comprising:
      a compatibility indicator identifying at least one identified hitch receiver to which the cargo accessory carrier is configured to be operably attached, wherein the at least one identified hitch receiver includes the hitch receiver; and
      at least one capacity indicator indicative of an operational load capacity of the cargo accessory carrier when attached to at least the hitch receiver.

14. The hitch match system of claim 13, wherein the compatibility indicator identifies at least a second hitch receiver to which the cargo accessory carrier is configured to be operably attached.

15. The hitch match system of claim 14, wherein the second visual indicator further includes at least a second capacity indicator indicative of an operational load capacity of the cargo accessory carrier when the cargo accessory carrier is attached to the at least the second hitch receiver.

16. The hitch match system of claim 13, wherein the cargo accessory carrier is configured to operably attach to a plurality of hitch receivers and wherein the compatibility indicator identifies the plurality of hitch receivers to which the cargo accessory carrier is configured to operably attach.

17. The hitch match system of claim 16, wherein the second visual indicator includes a plurality of capacity indicators identifying operational load capacities of the cargo accessory carrier when the cargo accessory carrier is attached to each of the plurality of hitch receivers.

18. The hitch match system of claim 13, wherein the first visual indicator is a label adhered to the hitch receiver and the second visual indicator is a label adhered to the cargo accessory carrier.

19. The hitch match system of claim 13, wherein the second visual indicator includes a matrix barcode providing access to at least one Internet website.

20. The hitch match system of claim 19, wherein the at least one Internet website includes information about at least one of the hitch receiver and the cargo accessory carrier.

21. The hitch match system of claim 13, wherein the operational characteristic is associated with a dimensional configuration of the hitch receiver.

22. A cargo accessory system comprising:
   a hitch mounting member;
   a cargo accessory carrier coupled to the hitch mounting member, wherein the cargo accessory carrier is configured to carry cargo; and
   a visual indicator incorporated with at least one of the cargo accessory carrier and the hitch mounting member, the visual indicator indicative of an operational characteristic of the cargo accessory carrier, the visual indicator comprising:
      a compatibility indicator identifying at least one hitch receiver to which the hitch member is capable of being operably attached; and
      at least one capacity indicator indicative of an operational load capacity of the cargo accessory carrier when the hitch mounting member is attached to a particular hitch receiver, wherein the at least one capacity indicator includes a plurality of capacity indicators associated with different hitch receivers to which the itch mounting member may be operatively coupled.

* * * * *